US012746549B2

(12) United States Patent
Samusik

(10) Patent No.: US 12,746,549 B2
(45) Date of Patent: Sep. 29, 2026

(54) HISTOLOGICAL CONTAINMENT SYSTEM WITH SUPPORT TILE

(71) Applicant: Parhelia Biosciences Corporation, Austin, TX (US)

(72) Inventor: Nikolay Samusik, Talent, OR (US)

(73) Assignee: PARHELIA BIOSCIENCES CORPORATION, Austin, TX (US)

( * ) Notice: Subject to any disclaimer, the term of this patent is extended or adjusted under 35 U.S.C. 154(b) by 546 days.

(21) Appl. No.: 18/468,888

(22) Filed: Sep. 18, 2023

(65) Prior Publication Data

US 2024/0091776 A1 Mar. 21, 2024

Related U.S. Application Data

(60) Provisional application No. 63/376,193, filed on Sep. 19, 2022.

(51) Int. Cl.
*B01L 3/00* (2006.01)

(52) U.S. Cl.
CPC ..... *B01L 3/5085* (2013.01); *B01L 2300/0609* (2013.01)

(58) Field of Classification Search
CPC ............... B01L 1/025; B01L 2300/047; B01L 2300/0609; B01L 2400/0457; B01L 3/5085; B01L 3/523; B01L 9/52; B41J 2/04541; B41J 2/0455; B41J 2/0458; B41J 2/14129; B41J 2002/14379; B41J 2202/13; G01N 1/312; G01N 2001/315
See application file for complete search history.

(56) References Cited

U.S. PATENT DOCUMENTS

| | | | | | |
|---|---|---|---|---|---|
| 4,985,206 | A | 1/1991 | Bowman et al. | | |
| 10,823,647 | B2 | 11/2020 | Guo et al. | | |
| 2009/0183581 | A1 * | 7/2009 | Wilkinson | .............. | G01N 1/30 435/307.1 |
| 2021/0108996 | A1 | 4/2021 | Bhakdi et al. | | |

OTHER PUBLICATIONS

Notification of Transmittal of the International Search Report and the Written Opinion of the International Search Authority—The European Patent Office—mailed Jan. 3, 2024, for PCT/US23/033044, 18 pages.

Parhelia Bio: "Omni-Stainer S12 Automated Pipetting Demo", Sep. 14, 2022, XP093112577, retrieved from the internet: URL: https://www.youtube.com/watch?v=pH15-2vgvvs, 1 page.

* cited by examiner

*Primary Examiner* — Jennifer Wecker
*Assistant Examiner* — Jonathan Bortoli
(74) *Attorney, Agent, or Firm* — Jackson Walker LLP

(57) ABSTRACT

A support tile for a container for use with histological samples can be held at a downwardly inclined angle. A planar support, having a histological sample coupled to an underside, can be supported by the support tile with a space therebetween for fluids to flow through. The support tile top includes an inclined ramp for fluid deposition, beginning a flow path down the support tile. A spreader step disperses fluids more uniformly across the support tile. The spreader step can be angled, such as convex, facing the flow path direction and delay the fluid flow through the flow path central portion until flow is dispersed to the flow path sides for more uniform flow across the sample. An aggregator at a support tile bottom directs fluid flow from sides toward the flow path central portion for wicking of the fluid by an end stop to drain from the support tile.

15 Claims, 7 Drawing Sheets

HISTOLOGICAL CONTAINMENT SYSTEM WITH SUPPORT TILE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to histological apparatuses and methods. More specifically, the disclosure relates to histological apparatuses, components, and methods of use for processing histological samples, including staining tissues with reagents.

Description of the Related Art

Histology refers to the microscopic structure of the tissues of living organisms. To study such structure, histological samples, such as tissues, are often excised from an organism, and examined with microscopes. To assist in the examination, reagents can be used to selectively react chemically with different structures in the histological sample to form a contrast between histological features, such as cells compared to surrounding cells. Multiple selected reagents for multiple cells can form a type of mosaic under the microscope to enable more accurate identification through the contrasts that are created.

Traditionally, histological treatment has been manually performed. The placement of the reagent, spread across the surface of the sample by the reagent, time for the reagent to react and timing of rinsing, and other variables in the preparation of the sample affect the quality and success of a suitable sample for examination. Thus, automatic systems and in some cases including robotic systems have been seen as a solution to control repetitive procedures for the sample preparation. Such systems can also be used for managing multiple samples in small spaces. Such automation has led to standards on sizes of platforms and other features to promote interchangeability between manufacturers. However, within those standards, variations in design and methods occur. As one example, the containers holding the histological samples are typically an open top container to allow the robotic access to the sample. The samples can be supported on structures to allow reagents and other fluids to be placed on the sample. The fluids may not flow across the samples uniformly to allow consistent exposure to the fluids, resulting in a compromised sample preparation.

Thus, there remains a need for improvements in histological systems and components for the preparation of histological samples, particularly those systems designed for automatic processing with robotic handling systems.

BRIEF SUMMARY OF THE INVENTION

The present disclosure provides a support tile for a histological container for use with histological samples. The support tile can be placed on a container support assembly in the container that allows the support tile to be inclined downward. A planar support, having a histological sample coupled to an underside, can be supported by the support tile with spacing strips between the planar support and the support tile to create a space for fluids to flow therethrough. The top portion of the support tile can be formed with a backward inclined ramp where reagents and other fluids are deposited for flowing through the space to prepare the sample. The fluids can be dispersed more uniformly across the surface of the sample by a spreader step formed on the support tile. In at least one embodiment, the spreader step can be angled, such as a convex curve, facing the fluid flow direction downward and be formed with a side flow inlet on both sides on the spreader step. The spreader step can be formed and sized to delay the fluid flow through the middle of the flow path on the support tile until flow is dispersed to the sides of the flow path. The dispersion promotes more uniform flow across the flow path on the support tile surface and therefore more uniform exposure of the sample to the fluids. The support tile can further include an aggregator at a bottom portion of the support tile toward the end of the flow path that directs the fluid flow on the sides laterally toward a central portion of the flow path on the support tile. The central portion of the support tile includes an end stop to restrain the sample from sliding off the inclined support tile and provide a wicking surface for the fluid flow in the central portion of the flow path and for flow from the sides of the flow path to aggregate for draining off of the support tile. The support tile can further include an anchor formed at the end of the support tile for engaging a container support to stabilize lateral movement of the end of the support tile in the container.

The disclosure provides a histological containment system having a container with at least one container support for preparing a histological sample at an inclined angle on the container support, comprising: a support tile configured to fit the container and be supported at the inclined angle on the container support, comprising: a top having a ramp configured to receive fluid and flow the fluid in a flow path down the ramp; and a support surface intersecting the top ramp and configured to support a sample and receive fluid flowing from the top ramp, wherein the top ramp extends below a plane of the support surface.

The disclosure also provides a histological containment system having a container with at least one container support for preparing a histological sample at an inclined angle on the container support, comprising: a support tile configured to fit the container and be supported at the inclined angle on the container support, the support tile comprising: a top having a ramp configured to receive fluid and flow the fluid in a flow path down the ramp; a support surface intersecting the top ramp and configured to support a sample and receive fluid flowing from the top ramp; and a wicking surface coupled at an end of the support surface and configured to drain fluids off the support surface.

The disclosure further provides a histological containment system having a container with at least one container support for preparing a histological sample at an inclined angle on the container support, comprising: a support tile configured to fit the container and be supported at the inclined angle on the container support, the support tile comprising: a top having a ramp configured to receive fluid and flow the fluid in a flow path down the ramp; a support surface intersecting the top ramp and configured to support a sample and receive fluid flowing from the top ramp; a spreader step between the top ramp and the support surface configured to disperse fluid across the support surface, the spreader step being angled toward the ramp from the support surface toward a central portion of the ramp to establish an elevation above the ramp based on an relative angle of the ramp to the support surface, the spreader step forming side portions of the spreader step that merge into the elevation of the ramp; and a wicking surface coupled at an end of the support surface and configured to drain fluids off the support surface.

DETAILED DESCRIPTION

Figure 2:
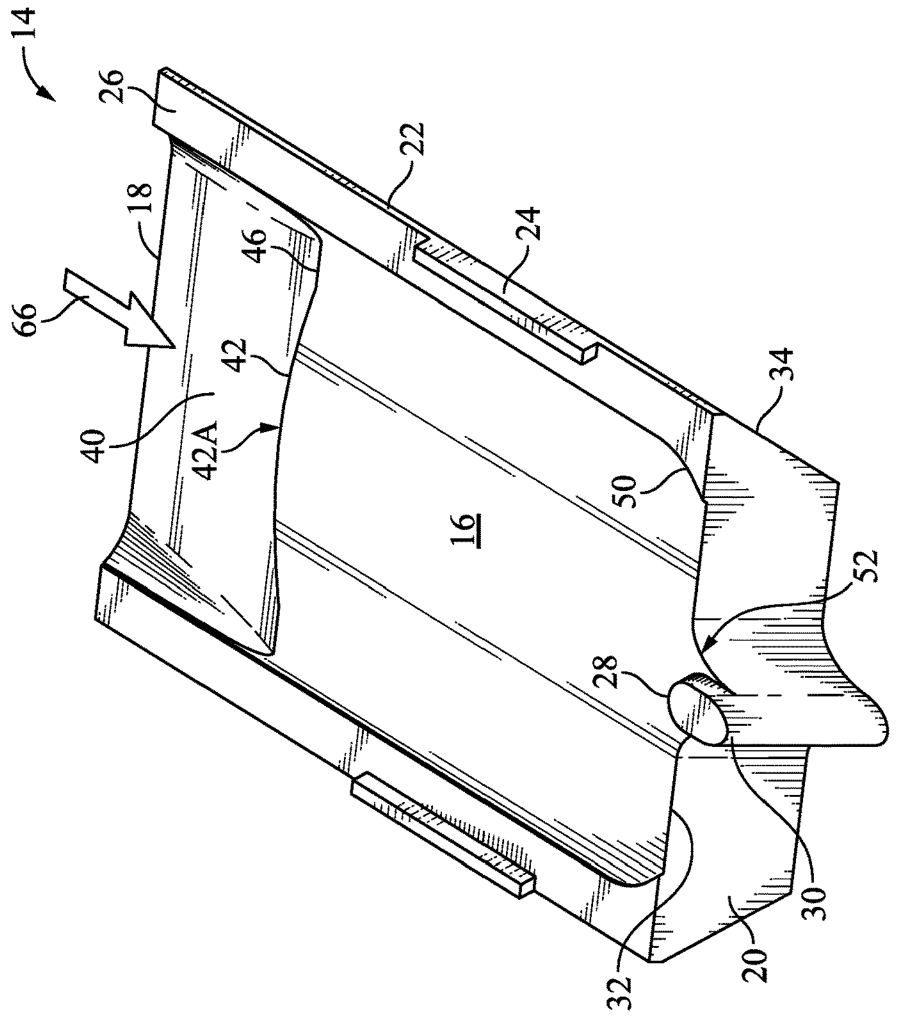
FIG. 2 is a schematic perspective top left-hand view of the support tile.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The device or system may be used in a number of directions and orientations. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a controller would encompass a processor and a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein.

The present disclosure provides a support tile for a histological container for use with histological samples. A container holds the support tile at a downwardly inclined angle. A planar support having the histological sample coupled to an underside can be supported by the support tile with a spacing strip between the planar support and the support tile to create a space for fluids to flow therethrough. The support tile top includes an inclined ramp for fluid deposition at a flow path beginning down the support tile. A spreader step formed on the support tile disperses fluids more uniformly across the support tile and the sample. The spreader step can be angled, such as curved convex, facing the flow path direction downward and delay the fluid flow through the flow path central portion until flow is dispersed to the flow path sides for more uniform flow across the sample. An aggregator at a support tile bottom directs fluid flow laterally from the sides toward a central flow path for central wicking of the fluid by an end stop to drain from the support tile.

Figure 1:
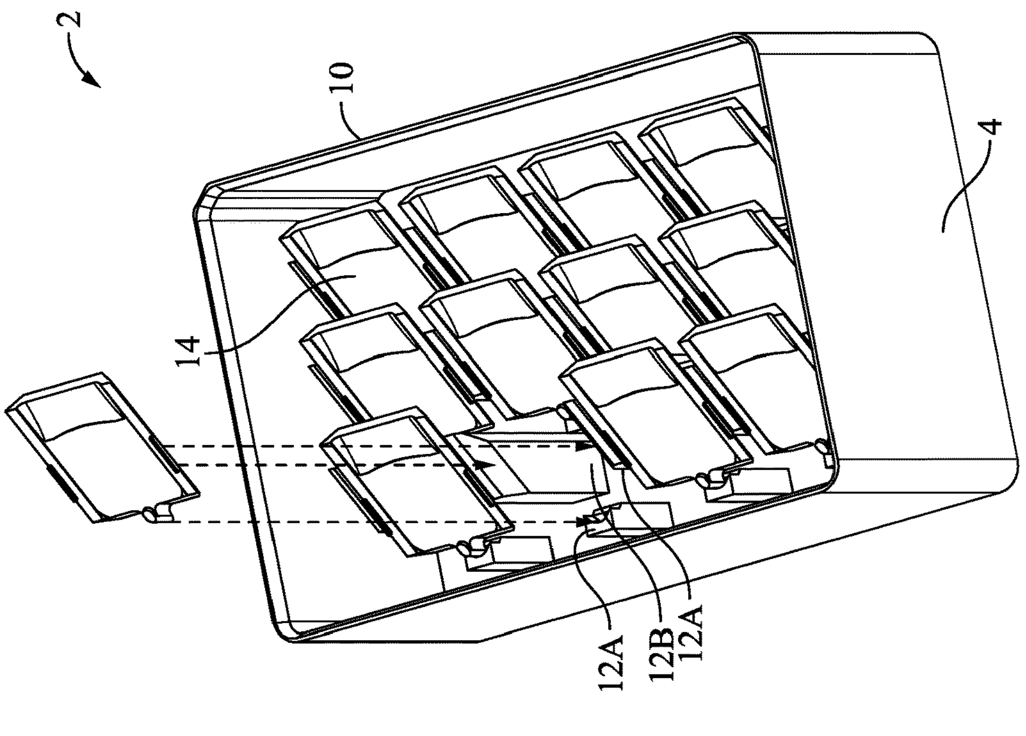
FIG. 1 is a schematic perspective view of an example of a histological containment system having a container with support tiles for preparing histological samples.

FIG. 1 is a schematic perspective view of an example of a histological containment system having a container with support tiles for preparing histological samples. The system 2 includes a container 4 generally having at least a partially open top 8 for ready access to components and histological samples in the container at various stages of processing the samples. The container includes one or more container support assemblies 12 to support one or more support tiles 14, generally in an inclined position between 5 degrees to 85 degrees, inclusive, and anywhere in between, including 45 degrees. In at least one embodiment, the container support assemblies 12 include side supports 12A for undersides of the support tile and an end support 12B that also restrains the support tile from downward movement at the inclination.

Figure 5:
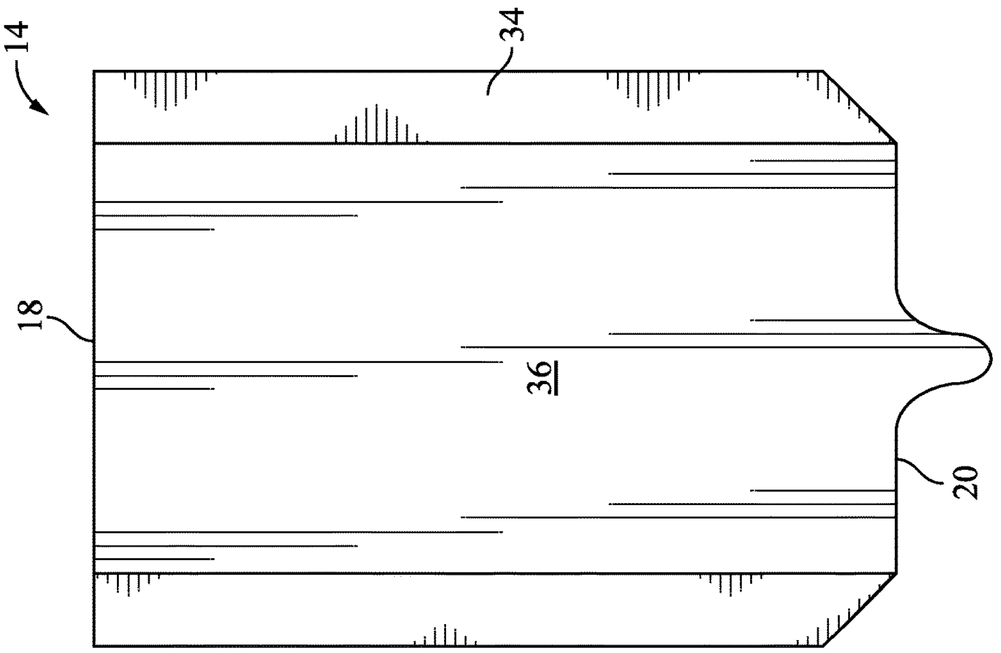
FIG. 5 is a schematic back view of the support tile of FIG. 3.
Figure 4:
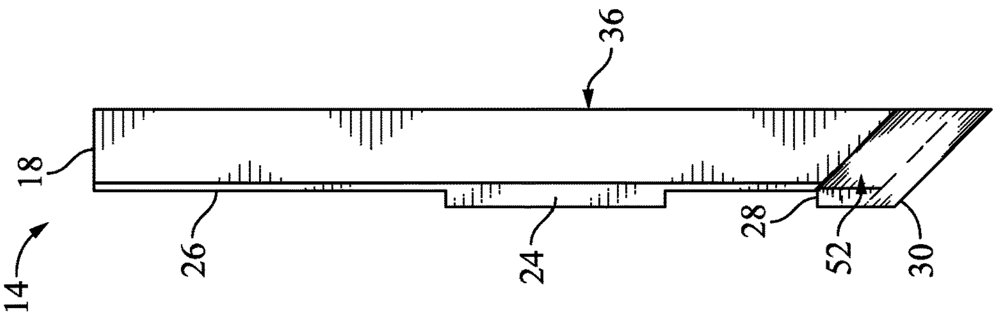
FIG. 4 is a schematic side view of the support tile of FIG. 3.
Figure 3:
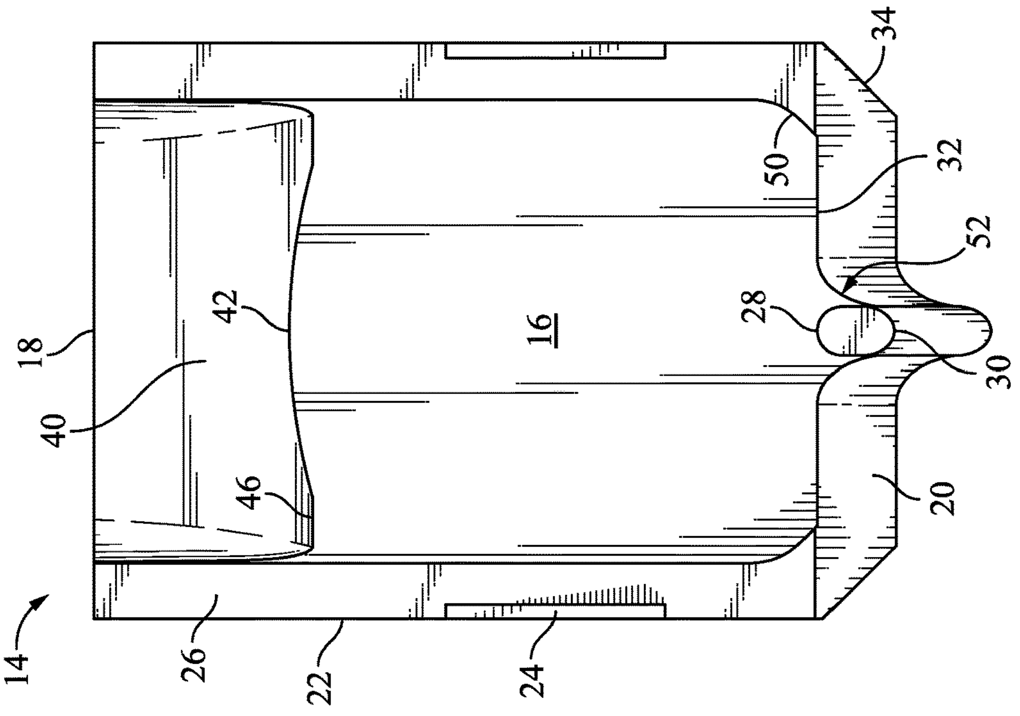
FIG. 3 is a schematic front view of the support tile of FIG. 2.

FIG. 2 is a schematic perspective top left-hand view of the support tile. FIG. 3 is a schematic front view of the support tile of FIG. 2. FIG. 4 is a schematic side view of the support tile of FIG. 3. FIG. 5 is a schematic back view of the support tile of FIG. 3. The support tile 14 includes a support surface 16 that supports a typical histological sample, shown in FIGS. 10 and 11. A top 18 of the support tile includes a fluid flow ramp 40 at an angle relative to the support surface 16 that starts deep at the top and ends shallow or merged near or at the planar level of the support surface 16. The ramp 40 is bounded by sides 22 to retain fluid on the ramp. The term "angle" and derivatives herein are used broadly and can include one or more linear segments or one or more curves with one or more radii or a combination thereof. On the other end of the support tile 14, a support surface end 32 can be at or near a bottom 20 of the support tile and ends a fluid flow path on the support surface 16 that starts with the ramp 40.

In at least one embodiment, spacing strips 26 can be used on each side of the support tile 14. The spacing strips 26 can be planar and used to create a space between the support surface 16 of the support tile 14 and a planar support supported by the support tile, shown in FIG. 11. The planar support can be, for example and without limitation, a typical cover slip or cover glass. A histological sample can be coupled to the underside of the planar support, shown in FIGS. 10 and 11. The spacing strips can be separate or formed integral with the support tile, the planar support, or both. The space between the sample and the support surface allows fluid to flow across the sample, advantageously in a capillary fashion, to prepare the sample. The height of the spacing strips 26 can be from 0 to 100 microns, inclusive, and anywhere in between, including 50 microns. A selected height of the spacing strips 26 to elevate the planar support slightly over the support surface 16 in part depends on the inclination angle, viscosity of the particular fluids to be deposited on the support tile, smoothness of the support surface, and other factors, understanding that an optimum size to provide satisfactory histological sample processing can be experimentally determined as would be within the capabilities of a person of ordinary skill in the art. The spacing strips 26 can extend longitudinally to the top 18 and therefore further form a side boundary for fluids on the ramp 40. In at least one embodiment, the spacing strips can be silicone to form a seal between the planar support and the support tile, although other materials including metals and composites can be used.

The bottom 20 of the support tile 14 includes an end stop 28 that extends above a plane of the support surface 16 sufficiently high to longitudinally restrain the planar support on the inclined support tile when supported in the container 4. An anchor 30 can be formed at the bottom 20 and can be integral with the end stop 28. The anchor 30 can engage the end support 12B to longitudinally restrain the inclined support tile on the side supports 12A in FIG. 1. In addition to the anchor 30 supporting an end of the support tile 14, the support tile further includes underside supports 34. In at least one embodiment, the underside supports 34 can be angled to support vertically the support tile 14 on the side supports 12A in FIG. 1, while also providing lateral support and stability between the side supports. Other shapes are possible and the shape of the underside supports are only illustrative.

A spreader step 42 can be formed at the juncture of the ramp 40 and support surface 16. The spreader step 42 assists in spreading fluid across the support surface. Fluid is generally deposited on a lateral central portion of the ramp 40. The spreader step 42 can disperse the fluid toward each side 22 of the support tile for more lateral coverage on the support surface 16 and therefore sample on a planar support over the support surface. The central portion 42A of the spreader step 42 can be elevated above the ramp 40 and planar with the support surface 16. To obtain such an elevation, the spreader step 42 can be angled into the ramp surface area, so the difference in height depends on the extent to which the angled portion protrudes into the ramp surface area. In at least one embodiment, the angled spreader step 42 forms a convex curve relative to the fluid flow path 66 down the ramp, so that the curve bends into the ramp surface area toward the top 18. The angled spreader step forms a difference in height in a central flow path 66 on the ramp to cause the fluid in the central flow path to spread toward the sides 22. The sides of the spreader step 42 can merge with the support surface 16 and form side flow inlets 46 for the fluid. Thus, the fluid flow can be spread across the support surface.

In at least one embodiment, the fluid flow path ends at the support surface end 32. The support tile 14 can further include an aggregator 50 at the support surface end that directs the fluid flow on the sides toward a central longitudinal portion of the flow path on the support tile. The central portion of the support tile includes the end stop 28. In addition to restraining the planar support on the inclined support tile, the end stop 28 provides an example of a wicking surface 52 for the fluid flow to aggregate for draining off of the support tile.

Figure 6:
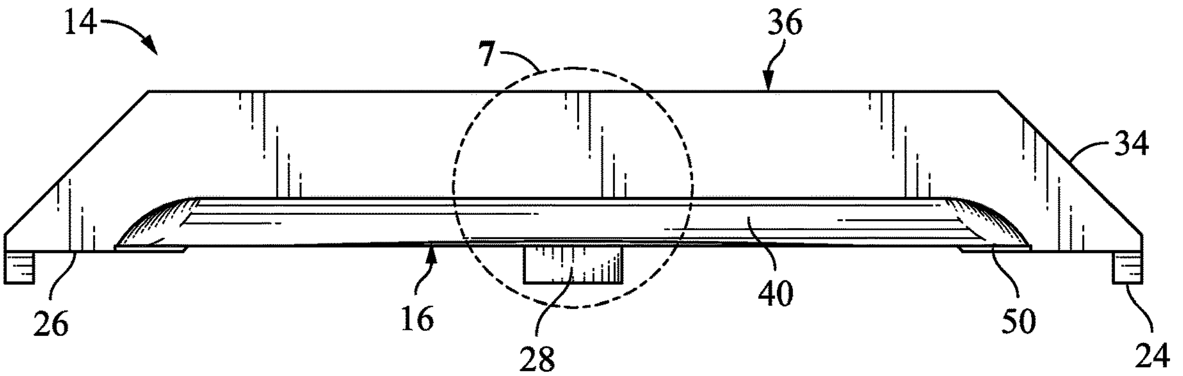
FIG. 6 is a schematic top view of the support tile of FIG. 3.
Figure 7:
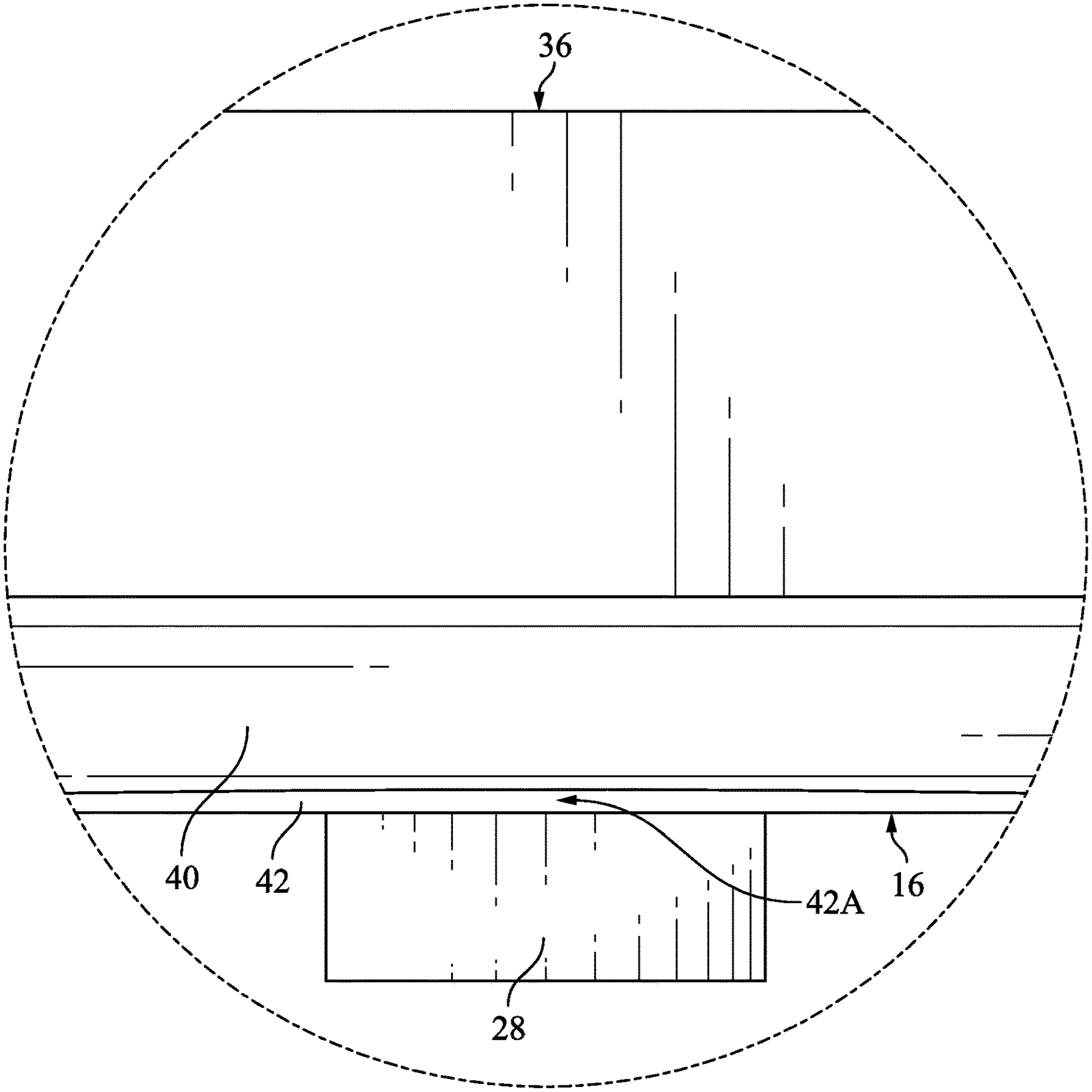
FIG. 7 is a schematic bottom view of the support tile of FIG. 3.
Figure 8:
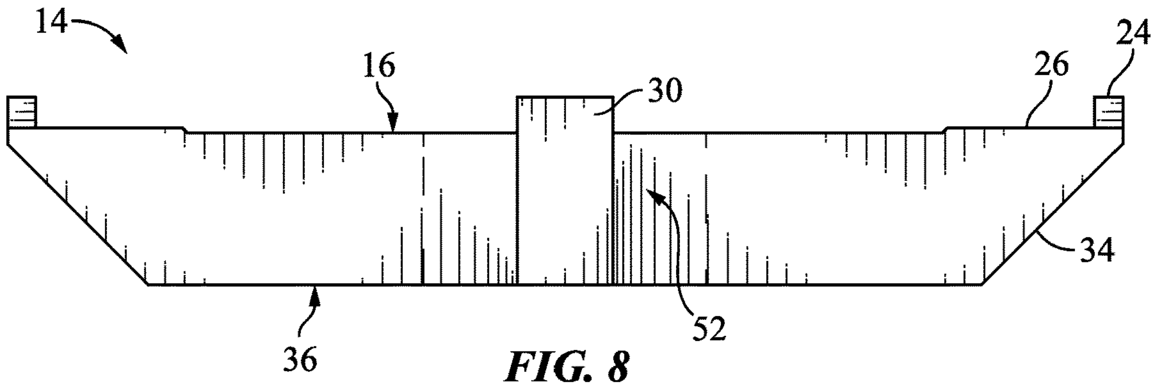
FIG. 8 is a schematic detail view of a spreader step shown in FIG. 6.

FIG. 6 is a schematic top view of the support tile of FIG. 3. FIG. 7 is a schematic detail view of a spreader step shown in FIG. 6. FIG. 8 is a schematic bottom view of the support tile of FIG. 3. The top view shows elevations of the support tile 14. The side rails 24 extend upwardly (that is, down in the illustrated orientation of the top view) from the support surface 16 generally sufficient to longitudinally restrain the planar support, shown in FIGS. 9 and 10. The spacing strips 26 on the sides 22 are shown extending upwardly from the support surface 16 and the ramp 40. The spreader step 42 can be formed symmetrically across the width of the support surface 16 and merge into the support surface elevation on the sides of the spreader step with the most difference in elevation being in the middle of the spreader step, that is, in the central flow path 66 of the support tile 14. The underside 36 of the support tile 14 is supported in the container 4 in FIG. 1 by the underside supports 34 and the anchor 30.

Figure 9:
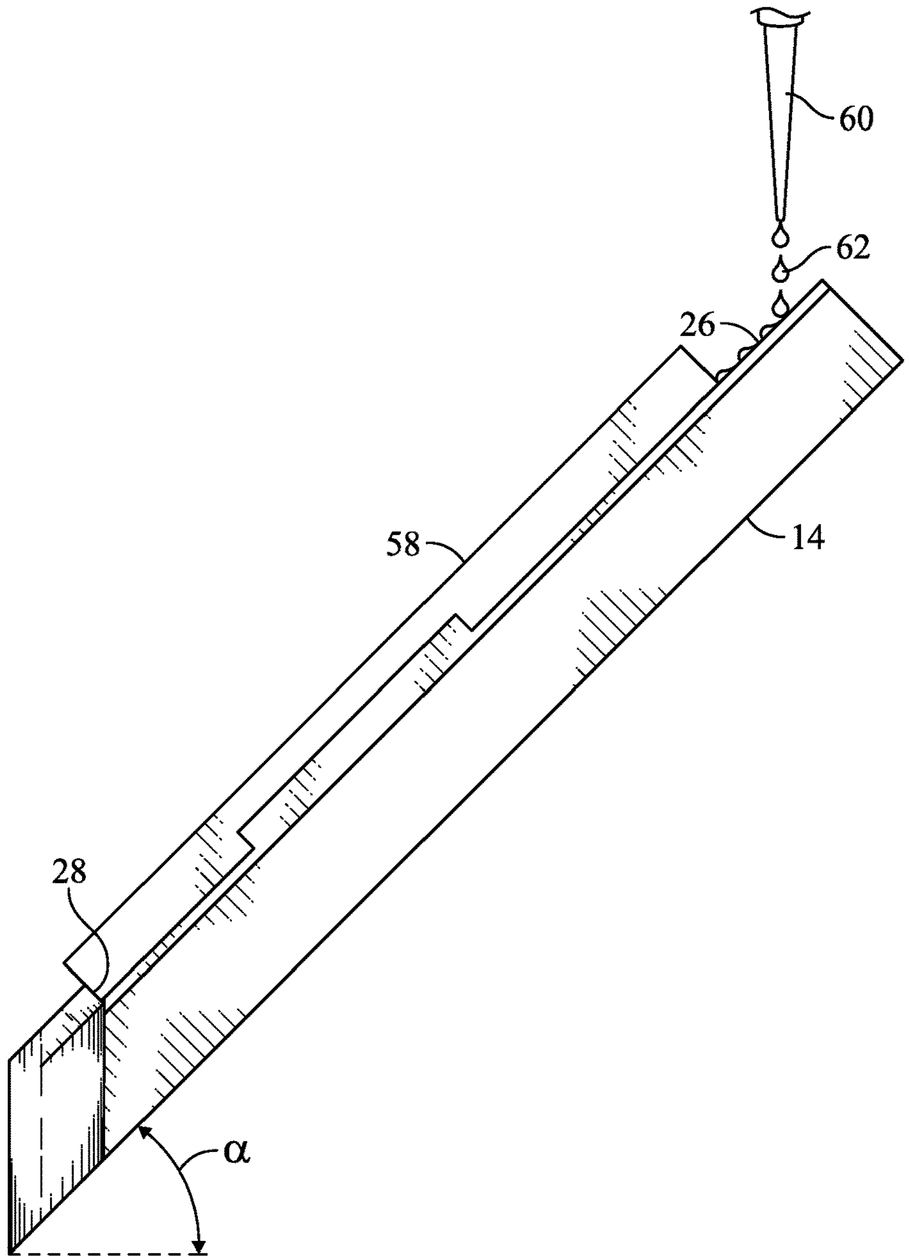
FIG. 9 is a schematic side view of the support tile in an inclined position supporting an illustrative planar support.
Figure 10:
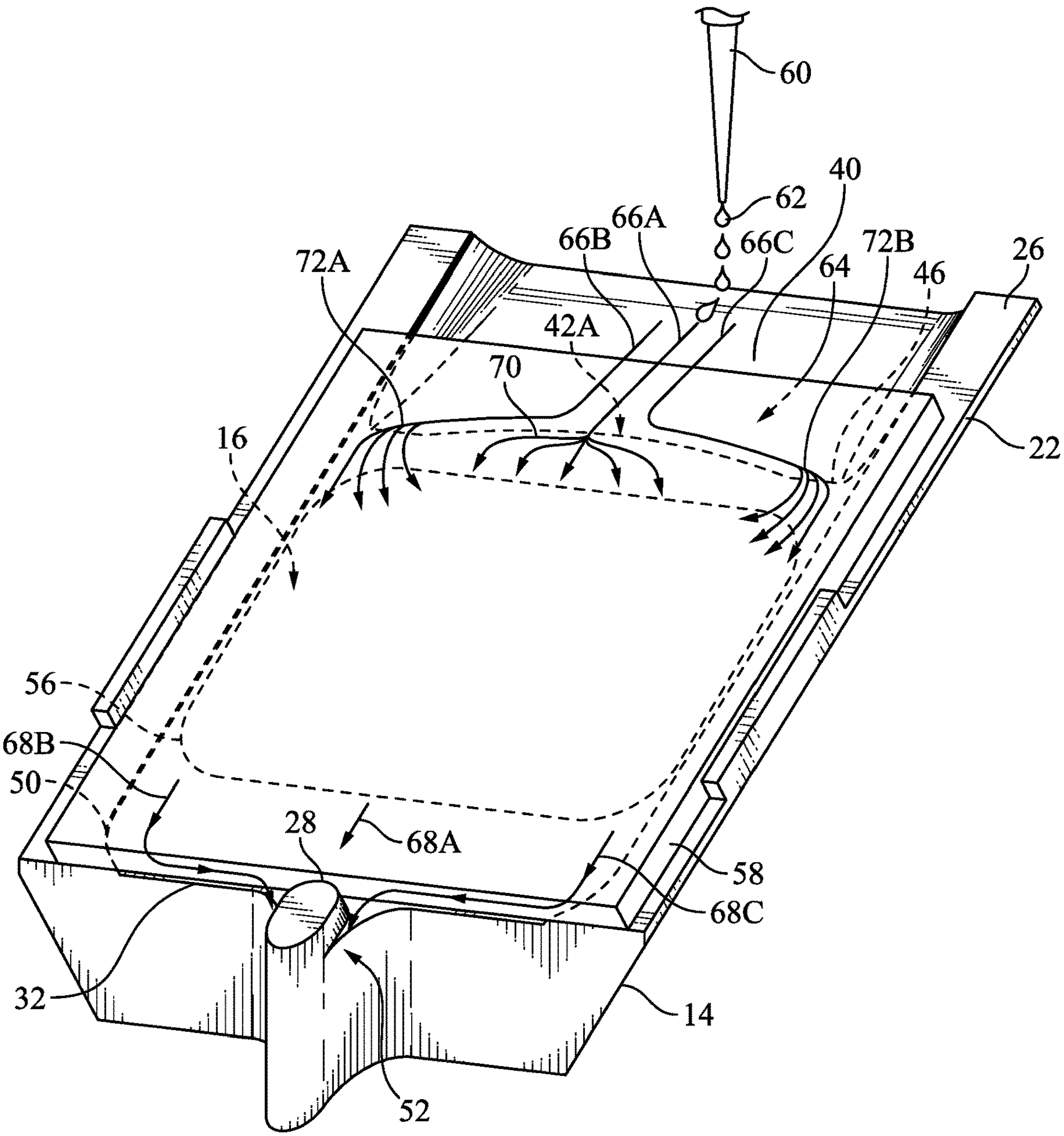
FIG. 10 is a schematic perspective top left-hand view of the support tile supporting the planar support of FIG. 9 with a histological sample coupled to an underside of the planar support and a space therebetween.
Figure 11:
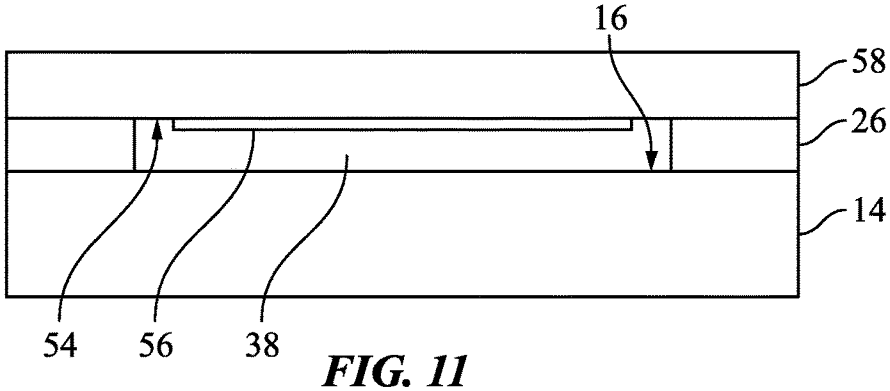
FIG. 11 is a schematic cross sectional view of the support tile supporting a planar support with a specimen on the underside of the planar support and a space therebetween.

FIG. 9 is a schematic side view of the support tile in an inclined position supporting an illustrative planar support. FIG. 10 is a schematic perspective top left-hand view of the support tile supporting the planar support of FIG. 9 with a histological sample coupled to an underside of the planar support and a space therebetween. FIG. 11 is a schematic cross sectional view of the support tile supporting a planar support with a specimen on the underside of the planar support and a space therebetween.

The support tile 14 can support a planar support 58 having a histological sample 56. The planar support 58 can overhang the ramp 40 with the juncture of the ramp and support surface 16 below the planar support. A pipette or other fluid dispenser 60 can dispense fluid onto the ramp 40, generally aligned with a central portion 42A of the spreader step and longitudinally above the planar support overhang. The sample 56 can be coupled to an underside 54 of the planar support 58 and supported above the support surface 16 of the support tile 14 in at least one embodiment by spacing strips 26 to establish a space 38 between the support surface 16 and the sample 56 and the planar support underside 54. In at least one embodiment, the height of the space 38 can be determined by the thickness of the spacing strip 26 between the support surface and the planar support 58. The underside 54 of the planar support restrains the fluid in the space 38, so that at least a portion of the fluid washes over the sample 56 to prepare the sample, such as staining the sample and other processes. Some of the centrally dispensed fluid flows down beginning central flow path 66A and beginning side flow paths 66B and 66C downstream of the dispensed fluid. The fluid in the flow paths impinge on the spreader step 42. The beginning side flows paths 66B and 66C can spread along the lateral surfaces of the spreader step 42 toward the respective side flow inlets 46 on the sides 22. The fluid in each side flow inlet 46 can flow into dispersive side flow paths 72A and 72B that can spread in a capillary fashion across the support surface 16 for more uniform contact with the sample 56 under the planar support 54. The fluid in the beginning central flow path 66A can overcome the spreader step 42 in a vicinity of the central portion 42A and flow onto the support surface 16 into dispersive central flow path 70. In some embodiments, the spreader step 42 can be formed to time the flow of the fluid into the dispersive side flow paths 72A and 72B with the time of the fluid flow into the dispersive central flow path 70 for a timed even dispersion on the support surface 16.

The dispersed fluid can flow in the space 38 between the planar support 58 and support surface 16 across the sample 56 for the intended preparation of the sample. As the fluid flows down the support surface 16, the fluid encounters the support surface end 32. For the fluid in the dispersive central flow path 70, at least some of the fluid will flow in an end central flow path 68A and encounter the perimeter of the end stop 28 to wick and flow down the end stop and off of the support tile 14, preferably into a container for other uses, recovery, or proper disposal. Other fluid, such as fluid from the dispersive side flow paths 72A and 72B will likely drip from the support surface end 32 without side aggregators 50 provided in the support tile 14. The aggregators 50 helps redirect fluid flow from the sides 22 into an end side flow path 68B and 68C toward the end central flow path 68A. The redirection helps establish wicking of the fluid along the flow paths 68B and 68C by the end stop 28. There may be several fluid flows from several sequences for proper preparation of the sample.

Figure 13:
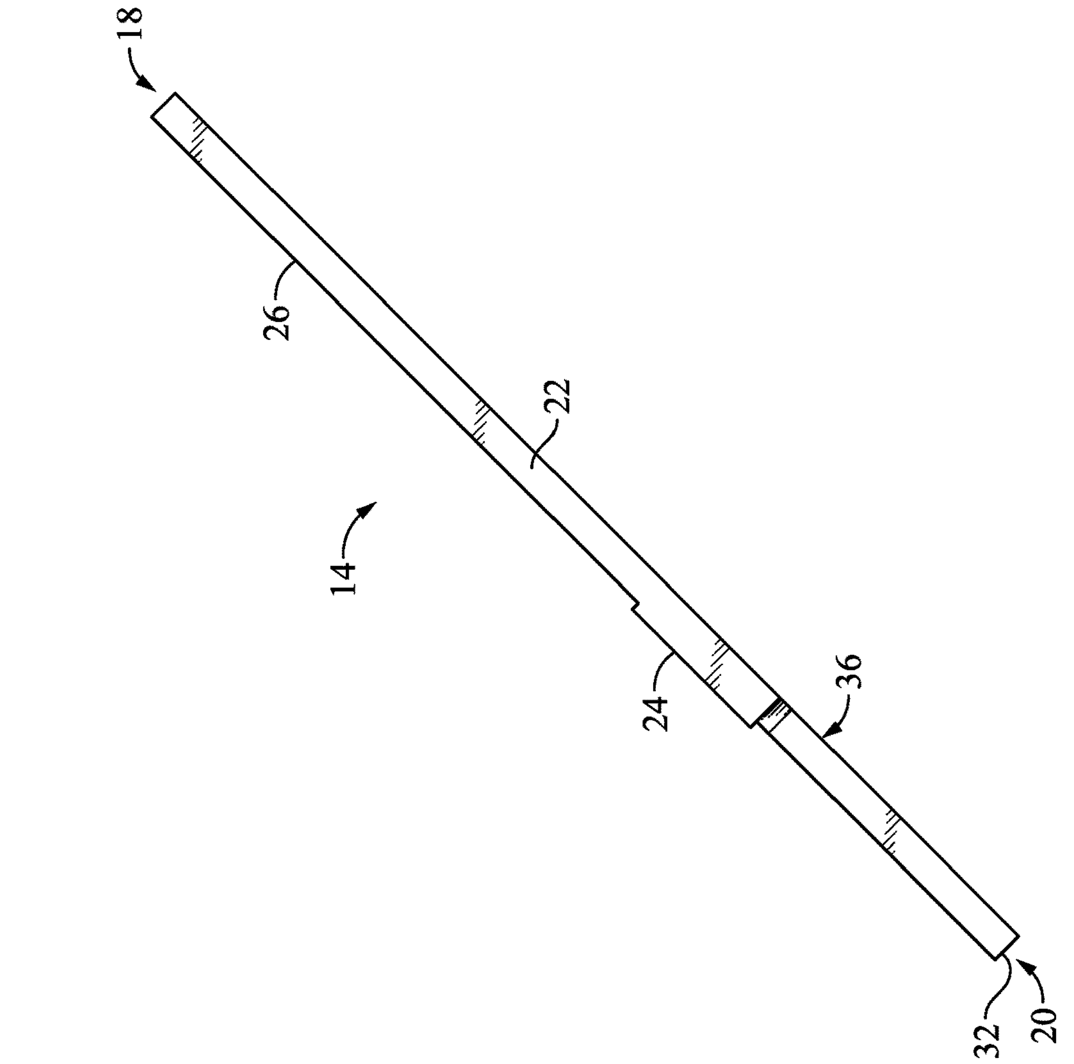
FIG. 13 is a schematic side view of the support tile of FIG. 12.
Figure 12:
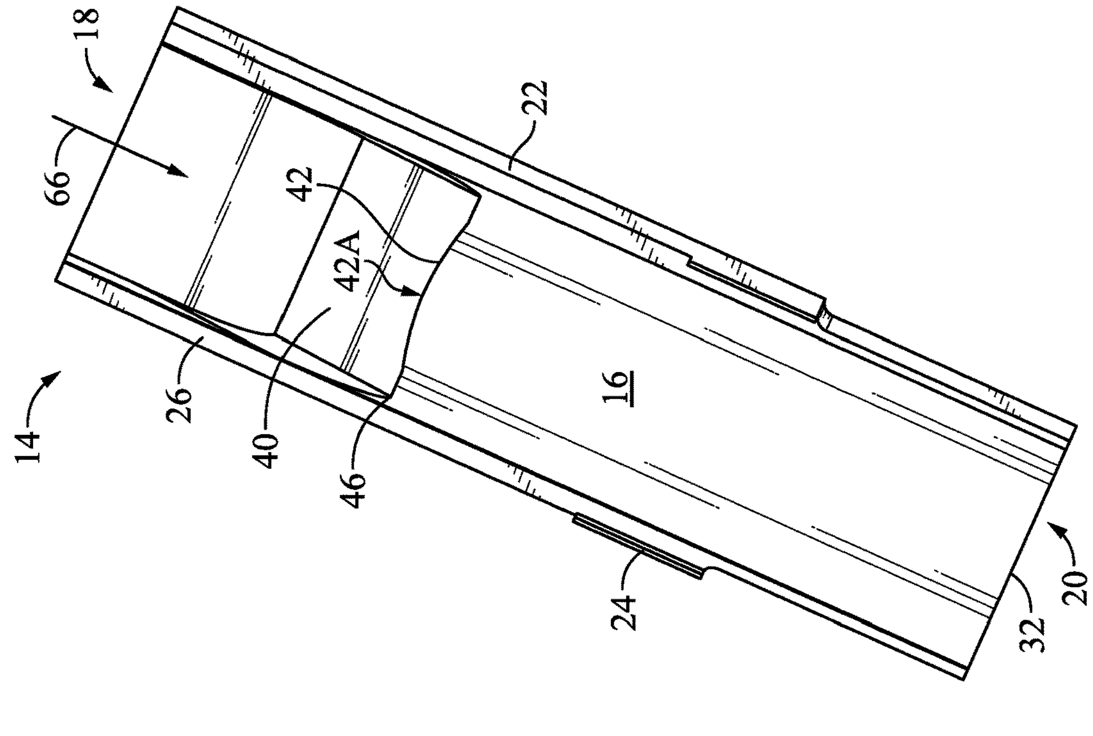
FIG. 12 is a schematic perspective top left-hand view of another embodiment of a support tile.
Figure 14:
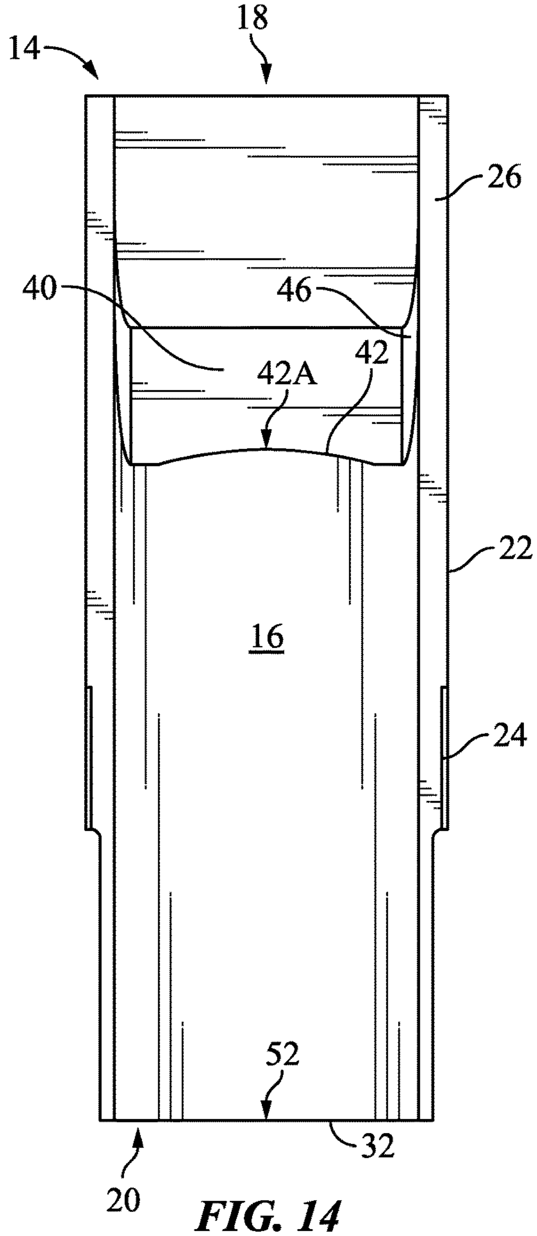
FIG. 14 is a schematic front view of the support tile of FIG. 12.
Figure 15:
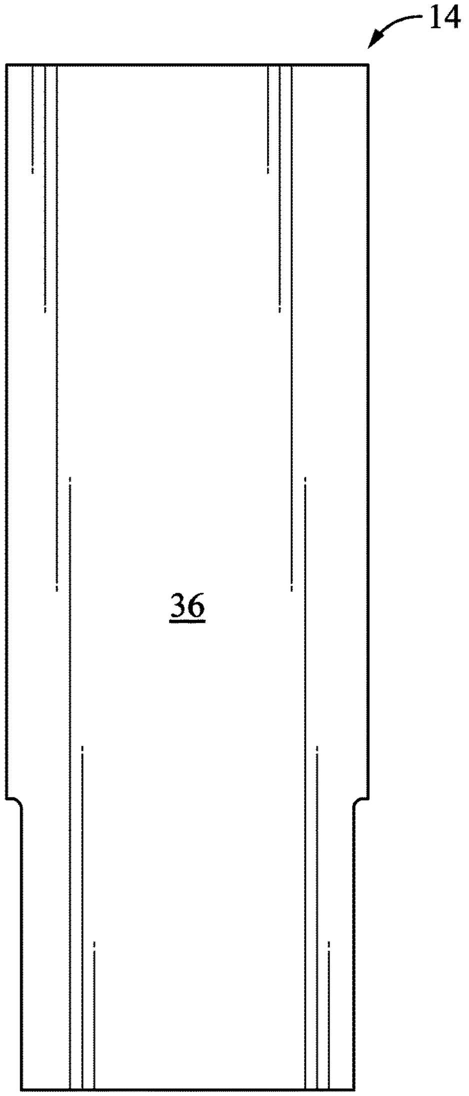
FIG. 15 is a schematic back view of the support tile of FIG. 12.
Figure 16:
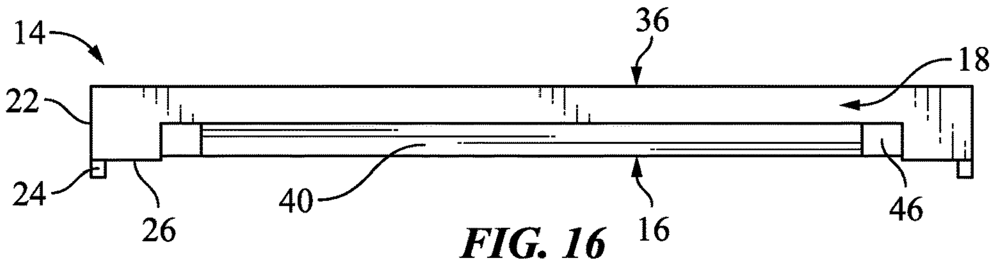
FIG. 16 is a schematic top view of the support tile of FIG. 12.
Figure 17:
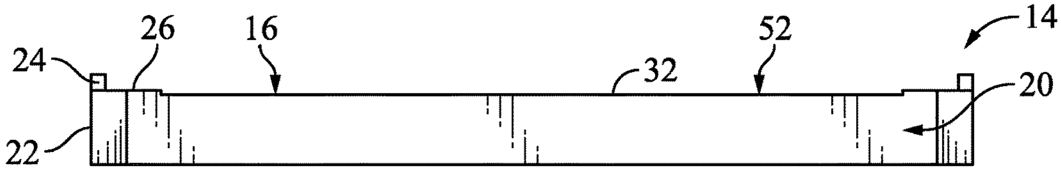
FIG. 17 is a schematic bottom view of the support tile of FIG. 12.

FIG. 12 is a schematic perspective top left-hand view of another embodiment of a support tile. FIG. 13 is a schematic side view of the support tile of FIG. 12. FIG. 14 is a schematic front view of the support tile of FIG. 12. FIG. 15 is a schematic back view of the support tile of FIG. 12. FIG. 16 is a schematic top view of the support tile of FIG. 12. FIG. 17 is a schematic bottom view of the support tile of FIG. 12. This embodiment is shaped to be used on a shelf section is formed to also support a typical laboratory slide used with a cover pad, and thus be interchangeable to simplify equipment needs. This embodiment of a support tile 14 is elongated compared to the above embodiment but functions similarly as the above embodiment. The support tile 14 can have a support surface 16 with sides 22 having spacing strips 26 and side rails 24 that can extend from the top 18 to the bottom 20 of the support tile (or anywhere in between and/or portions in between), as described above. The support tile 14 also includes the fluid flow ramp 40 described above but somewhat elongated and may have an leading surface with less slope, if any, than the fluid flow ramp 40 described in the above embodiment. The spreader step 42 with a central portion of the spreader step 42A can assist in dispersing fluid flow more uniformly across the flow surface 16, as described above and shown in more detail in FIG. 7, as an example. Sides of the spreader step 42 can merge with the support surface 16 and form side flow inlets 46 for fluid flow from the fluid flow ramp. Lateral fluid flow along the spreader step 42 can flow into and over the side flow inlets 46 to help direct flow down the support surface 16 in a spreading fashion as illustrated in FIG. 10.

In this embodiment, the support tile 14 rests on an end support in the container 4 independent of the end stop 28 with the anchor 30 in the above embodiment. Therefore, fluid gathers on the end of the support surface 16 that forms a wicking surface 52 in contact with the end support in the container.

Other and further embodiments utilizing one or more aspects of the inventions described above can be devised without departing from the disclosed invention as defined in the claims. For example, other embodiments can include different shapes and rations of thickness, length, width, different shapes of support tile underside supports, ramps, anchors and other features unless specifically excluded in the text of this Application, and other variations than those specifically disclosed herein within the scope of the claims.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intend to protect fully all such modifications and improvements that come within the scope of the following claims.

What is claimed is:

1. A histological containment system comprising:

a container including a bottom surface;

a support assembly positioned within the container; and a support tile configured to fit within the container; wherein the support assembly is configured to support the support tile at an inclined position relative to the bottom surface and wherein the support tile comprises:

a ramp having a top portion and a bottom portion, the ramp configured to receive a fluid at the top portion and enable the fluid to flow from the top portion to the bottom portion; and a support surface intersecting the bottom portion of the ramp and configured to support a histological sample and receive the fluid flowing from the bottom portion.

2. The histological containment system of claim 1, wherein the ramp further includes a ramp central portion and the histological containment system further comprises a spreader step between the ramp and the support surface, wherein the spreader step is configured to disperse the fluid across the support surface and is angled toward the ramp from the support surface toward the ramp central portion establishing an elevation above the ramp based on an angle of the ramp relative to the support surface, wherein the spreader step includes spreader step side portions merging into the elevation.

3. The histological containment system of claim 1, wherein the support surface comprises a support surface end and the histological containment system further comprises a wicking surface coupled at the support surface end and configured to drain the fluid off the support surface.

4. The histological containment system of claim 1, further comprising an end stop coupled to the support surface and configured to longitudinally restrain the histological sample on the support surface.

5. The histological containment system of claim 1, wherein the support surface includes a support surface end, support surface sides and a laterally central portion and the histological containment system further comprises an aggregator disposed toward the support surface end on the support surface sides and configured to direct the fluid flowing along the support surface sides toward the laterally central portion.

6. The histological containment system of claim 1, further comprising one or more spacer strips configured to support the histological sample above the support surface.

7. The histological containment system of claim 1, wherein the support tile includes a support tile bottom and the histological containment system further comprises an anchor coupled to the support tile bottom and configured to longitudinally restrain the support tile on the support assembly.

8. The histological containment system of claim 1, wherein the support assembly includes a plurality of side supports and an end support and wherein the support tile includes an underside comprising support tile underside supports configured to support the support tile on the support assembly and laterally restrain the support tile between the plurality of side supports.

9. The histological containment system of claim 1, wherein the support tile is configured to support a planar support above the support tile having the histological sample, wherein the planar support includes a planar support bottom side and the histological sample is attached to the planar support bottom side.

10. The histological containment system of claim 1, wherein the support surface includes a support surface end and the histological containment system further comprises:

a wicking surface coupled at the support surface end and configured to drain the fluid off the support surface.

11. The histological containment system of claim 10, wherein the ramp includes a ramp central portion and the histological containment system further comprises a spreader step between the ramp and the support surface, wherein the spreader step is configured to disperse the fluid across the support surface and is angled toward the ramp from the support surface toward the ramp central portion establishing an elevation above the ramp based on a relative angle of the ramp to the support surface, wherein the spreader step has spreader step side portions merging into the elevation.

12. The histological containment system of claim 10, wherein the support surface includes a support surface end, support surface sides and a laterally central portion and the histological containment system further comprises an aggregator disposed toward the support surface end on the support surface sides and configured to direct the fluid flowing along the support surface sides toward the laterally central portion.

13. The histological containment system of claim 1, wherein the support surface includes a support surface end and wherein the ramp includes a ramp central portion and the histological containment system further comprises a spreader step between the ramp and the support surface, wherein the spreader step is configured to disperse the fluid across the support surface and is angled toward the ramp from the support surface toward the ramp central portion establishing an elevation above the ramp based on an angle of the ramp relative to the support surface, wherein the spreader step has spreader step side portions merging into the elevation; and a wicking surface coupled at the support surface end and configured to drain the fluid off the support surface.

14. The histological containment system of claim 13, further comprising one or more spacer strips configured to support the histological sample above the support surface.

15. The histological containment system of claim 13, wherein the support surface includes a support surface end, support surface sides and a laterally central portion and the histological containment system further comprises an aggregator disposed toward the support surface end on the support surface sides and configured to direct the fluid flowing along the support surface sides toward the laterally central portion.

* * * * *